H. DE F. ARNOLD.
RADIORECEIVING SYSTEM.
APPLICATION FILED JAN. 5, 1916.
1,367,224.
Patented Feb. 1, 1921.
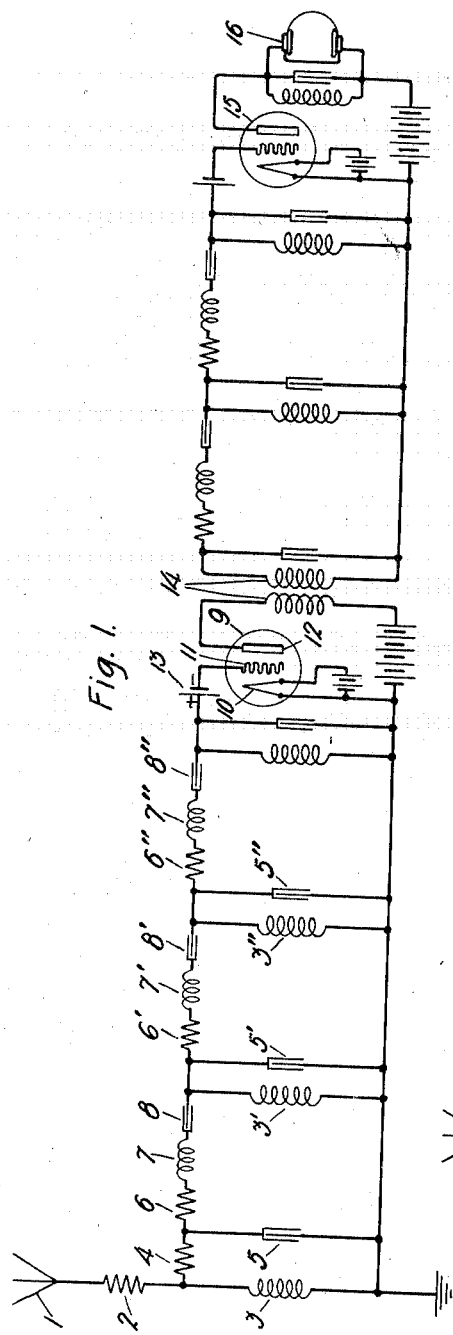
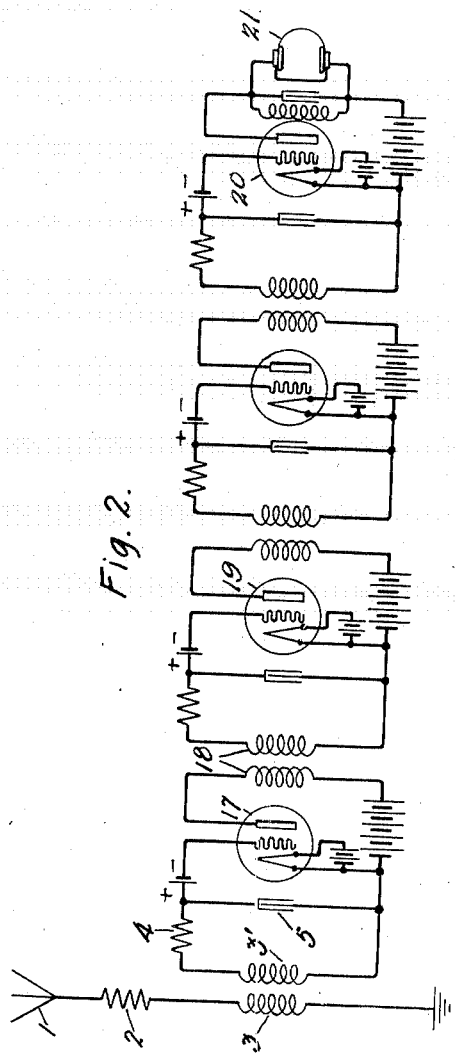
Inventor:
Harold D. Arnold.
by *L. C. James*, Att'y.

UNITED STATES PATENT OFFICE.

HAROLD DE FOREST ARNOLD, OF EAST ORANGE, NEW JERSEY, ASSIGNOR TO WESTERN ELECTRIC COMPANY, INCORPORATED, OF NEW YORK, N. Y., A CORPORATION OF NEW YORK.

RADIO-RECEIVING SYSTEM.

1,367,224.  Specification of Letters Patent.  Patented Feb. 1, 1921.

Application filed January 5, 1916. Serial No. 70,509.

*To all whom it may concern:*

Be it known that I, HAROLD DE FOREST ARNOLD, a citizen of the United States, residing at East Orange, in the county of Essex and State of New Jersey, have invented certain new and useful Improvements in Radio-Receiving Systems, of which the following is a full, clear, concise, and exact description.

This invention relates to receiving circuits for radio telephony and telegraphy.

Its object is to provide a method and a system of circuits by which it is possible to discriminate between the effects of impulsive electric forces acting upon the system and of periodic forces by which signals are transmitted.

This object is accomplished by employing selectively responsive but highly damped receiving circuits for the reason and in the manner described below.

In any electrical network in which there is no damping, but which is selectively responsive to one or more frequencies, the effect of an impulsive blow upon the system is to set the latter oscillating in its own natural frequencies, which frequencies are the same as those to which the system will respond most readily when excited by a steady periodic driving force, *e. g.* forced or sustained signal oscillations. It is therefore impossible by means of any system, however complicated, in which damping is not present, to discriminate between the effects upon the system of forced oscillations and of impulsive disturbances.

On the other hand, when damping is present and the system is selectively responsive to forced or signal oscillations of a given frequency, the frequencies of free or natural oscillation of the system, occurring when the latter is impulsively excited, are different from the frequencies of forced oscillation by an amount which depends upon the damping. The effect of introducing damping is therefore to permit a slight discrimination between free or natural oscillations and forced or signal oscillations of the frequency for which the system is tuned, but since the introduction of damping decreases the sharpness of tuning of the system, this discrimination is accomplished at the expense of high selectivity. In this invention the discrimination between forced and free oscillations is effected by the addition of sufficient damping to render the network practically aperiodic, and the disadvantage resulting therefrom is overcome by employing a number of such resonantly responsive but damped systems arranged in succession in such a way as to increase the selectivity. The losses introduced due to the damping may be made up by the use of amplifiers.

In order to recite in different words the principles underlying this invention, let us consider an oscillation circuit having the inductance "L", capacity "C" and resistance "R". Assume, first, that the value of the resistance is zero, and that sustained oscillations of various frequencies are supplied to this circuit, and that the current produced thereby is measured. If a plot is made of the values of the frequency, and the corresponding values of the current, it will be seen that the current rises sharply to a maximum at a particular value of the frequency. Now, let the resistance be given the value R, and another set of values taken. It will now be found that the current does not rise so sharply to its maximum value, but that the maximum value of the current is produced by the same frequency as in the first case. In other words, the introduction of resistance into an oscillation circuit does not vary that value of the frequency which produces the maximum current for given values of L and C. The above has to do only with sustained or forced oscillations. If we now consider that the value of the resistance in such an oscillation circuit as was considered above is zero, and if we also impulsively excite this oscillation circuit, it is found that the natural frequency of this circuit is the same as that frequency which gave rise to the maximum current in the two cases considered above. This value of the frequency is $$f = \frac{1}{2\pi\sqrt{LC}}$$

If we now give the resistance the value R, and impulsively excite the oscillation circuit, it is found that the natural frequency of the same is given by the value $$f = \frac{1}{2\pi}\sqrt{\frac{1}{LC} - \frac{R^2}{4L^2}}$$

It is seen that the effect of introducing resistance or damping into an oscillation circuit is to give this circuit a natural frequency which is different from the frequency of forced oscillations which produce maximum current in the circuit. If the oscillation circuit is tuned to the frequency $$f = \frac{1}{2\pi\sqrt{LC}}$$

then sustained oscillations of this frequency will produce maximum current in the circuit, and the circuit is in resonance with the sustained oscillations. This is true whether resistance is present or not, but if resistance is present and the circuit is impulsively excited, the natural frequency of this circuit now has a different value from the frequency for which the circuit is tuned. This makes it possible, by inserting resistance or by using damping in an oscillation circuit, to discriminate between forced and free oscillations, by tuning the signal circuit to the frequency of the forced oscillations, whereby the signal circuit will be unresponsive to the different frequency free oscillations.

This invention will be described more in detail in connection with the drawings, in which Figures 1 and 2 represent respectively forms which may be taken by the receiving circuit of this invention.

Referring to Fig. 1, 1 represents an antenna including a damping resistance 2 and an inductance coil 3. Across the terminals of the inductance 3 is connected a circuit consisting of the damping resistance 4 and a condenser 5. Across the terminals of condenser 5 is connected a succession of resonant and damped circuits, of which the portion 6, 7, 8, 3' and 5' is typical. By proper design of these elements of the recurring network shown, it is possible to secure a highly selective network, as explained above. The amplifier 9 consisting of heated filament 10, grid 11 and plate 12 has its input terminals connected across one of these elements and has its output terminals connected across one winding of the transformer 14. The battery 13 is connected in the grid circuit for the purpose of maintaining the grid at a negative potential with respect to the filament. The object of this amplifier is to make up the losses incurred during the passage of the received wave through the chain of resonant and damped circuits between it and the antenna, and to further increase this energy and impress it by means of the transformer 14 upon a similar chain of resonant and damped circuits. The thermionic device 15 is designed to detect oscillations impressed upon it; in this respect its function is different from that of the device 9, which is intended to amplify. The detected currents appearing in the output circuit of the detector 15 are then impressed upon a suitable translating device, as, for example, the telephone receiver 16. It is clear that any number of systems of resonant circuits and amplifiers may be used.

Referring to Fig. 2, 1, 2 and 3 represent an antenna similar to that of Fig. 1. The coil 3' is inductively coupled to the coil 3 in the antenna, and is included in the resonant circuit 3', 4 and 5, which is rendered aperiodic by the resistance 4. 17 is an amplifier whose function is similar to that of the amplifier 9 in the first figure. By means of transformer 18, the oscillations are passed on to a second resonant and damped circuit connected to the input circuit of the amplifier 19, which in turn may supply other similar resonant circuits. The last resonant circuit is connected to a detecting device 20, whose output circuit supplies a suitable translating device 21.

As in the ordinary case, the antenna of the radio system may be replaced by conducting lines for carrier transmission.

It should be understood that the features of the invention herein disclosed and claimed are not limited to signaling or even to electric transmission, since the same principles are applicable to selective transmission of energy in any medium.

It will be clear that the method and circuits disclosed herein are equally applicable to wire signaling systems in which interfering currents or impulsive disturbances are present, and also to signaling in any medium in which periodic waves or pulsations may be propagated.

What is claimed is:

1. The method of receiving signals free from static interference, which consists in selectively receiving signals in accordance with the frequency of forced oscillations and in damping free oscillations, for giving the frequency thereof a value different from that of the signal oscillations to be received.

2. The method of signal reception, which consists in damping the received oscillations for giving the frequency of free oscillations a value different from that of the signal oscillations to be received, amplifying the signal oscillations, and in selectively receiving the amplified signal oscillations to the exclusion of the different frequency free oscillations.

3. In an electric transmission system, a highly damped wave selective means and an amplifying device constituting therewith a transmission element, and a second similar element connected thereto in cascade relation.

4. In an electric transmission system, wave selective means having a natural frequency different from that of the sustained frequency to which it is most strongly responsive and an amplifier constituting therewith a transmission element, and a second similar element connected thereto in cascade relation.

5. A radio receiving system comprising an antenna, circuits coupled thereto in tandem, associated detecting means, and damping means associated with said circuits whereby they are rendered aperiodic.

6. A radio receiving system comprising an antenna, a chain of resonant circuits coupled thereto and an associated detecting means, each of said circuits being rendered aperiodic by suitable damping.

7. The combination in a radio receiving system of an antenna, a system of highly damped resonant circuits coupled in tandem to said antenna, said circuits being arranged in tandem and a detecting device responsive to currents in said circuits.

8. The combination in a radio receiving system of an antenna, a system of highly damped resonant amplifying circuits coupled in tandem to said antenna, said circuits being arranged in tandem and a detecting device responsive to currents in said circuits.

9. Means for reducing the effect of impulsive disturbances at the receiver of an electric transmission system comprising a circuit resonant to relatively sustained waves the energy of which it is desired to receive, and damping means in said circuit of such value as to cause said circuit to impart to disturbing energy a characteristic differing sufficiently from that of the sustained waves to permit discrimination between said disturbing energy and said sustained waves.

10. A receiving system comprising an energy receiving element, highly damped means selectively responsive to desired energy oscillations of a given signaling frequency which are to be received associated with said element, a receiving circuit and means for transferring energy from said highly damped means to said receiving circuit.

11. A signaling system comprising an energy receiving element and a highly damped circuit tuned to the frequency of desired signals directly associated with said element.

12. An electrical signaling circuit comprising a receiving conductor and a highly damped circuit directly connected thereto, said highly damped circuit being tuned to the frequency of desired signals.

13. A signaling receiving circuit comprising a receiving conductor and a plurality of highly damped circuits connected in tandem to said conductor, each of said highly damped circuits being tuned to the frequency of desired signals.

14. A receiving system comprising a receiving conductor, circuits coupled thereto in tandem, associated detecting means, and damping means associated with said circuits whereby they are rendered aperiodic.

15. A receiving system comprising a receiving conductor, a chain of resonant circuits coupled thereto, and associated detecting means, each of said circuits being rendered aperiodic by suitable damping.

16. The combination in a receiving system, of a receiving conductor, a system of highly damped resonant circuits connected in cascade relation and coupled to said conductor, and a detecting device responsive to currents in said circuits.

17. The combination in a receiving system, of a conductor, a system of highly damped resonant amplifying circuits coupled to said conductor, all of said circuits being connected in cascade relation and a detecting device responsive to currents in said circuits.

18. The method of receiving signals which comprises converting substantially all of the static energy received therewith into oscillations differing in frequency from that of said signals without changing the frequency of the received signal energy and selecting out the oscillations of the frequency of the received signal wave from said converted energy of different frequency.

19. In a radio receiving system, an indicating instrument, a recurrent net-work of similar sections, said net-work containing damping resistance in each section, and means for transferring received energy to said indicating instrument through said network.

20. A system for selectively transmitting periodic energy of a given frequency to the substantial exclusion of other energy, comprising a plurality of energy transfer devices arranged in tandem, each of said devices being highly damped and having its stiffness and inertia factors so related as to make said device most strongly responsive to periodic energy of the given frequency.

21. A selective transmission device comprising a plurality of similar circuits connected in cascade, each of said circuits being tuned to the same frequency and having large damping.

22. Means for eliminating the effect of disturbances upon transmission lines comprising means for imparting to substantially all of the disturbing energy a characteristic differing from that of the energy to be transmitted, and means for selectively transmitting to a translating device the energy to be transmitted, to the substantial exclusion of said disturbing energy of different characteristic.

23. The combination at a signal station of a signal circuit and an electric wave filter connected thereto, said filter comprising a plurality of recurring sections, each of said sections comprising lumped resistance, lumped capacity and lumped inductance, said resistance capacity and inductance having values depending upon the frequency of the impulses to be transmitted through said filter.

In witness whereof, I hereunto subscribe my name this 4th day of January, A. D. 1916.

HAROLD DE FOREST ARNOLD.